April 29, 1952     O. W. WILEY     2,595,115
APPARATUS FOR CUTTING AND SIZING CELLULAR GLASS SLABS
Filed May 14, 1948     3 Sheets-Sheet 1
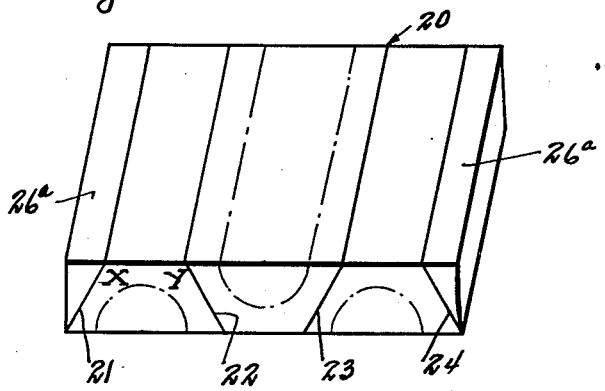
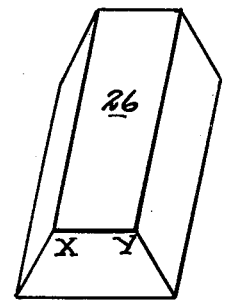
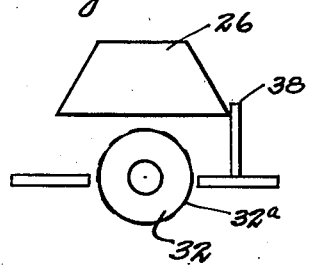
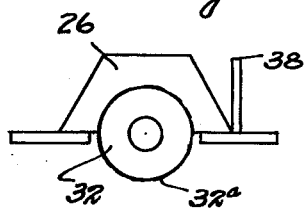
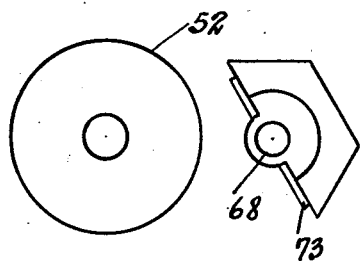
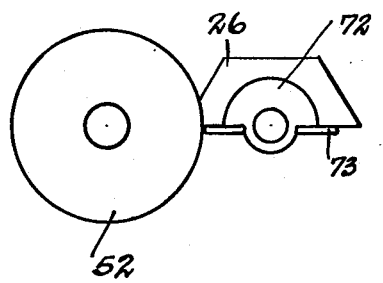
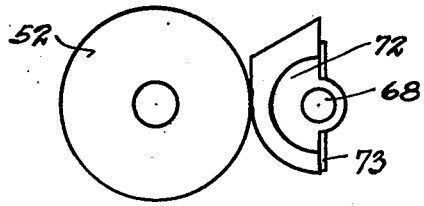
INVENTOR
OTIS W. WILEY.
BY Olen E. Bee
ATTORNEY.

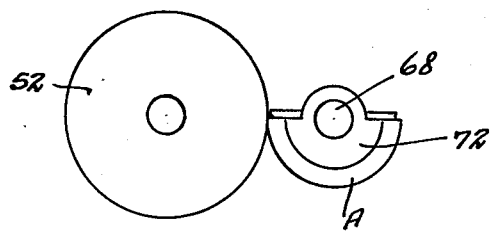
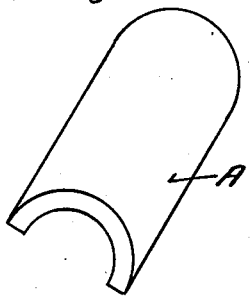
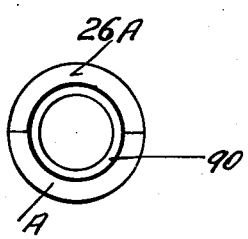
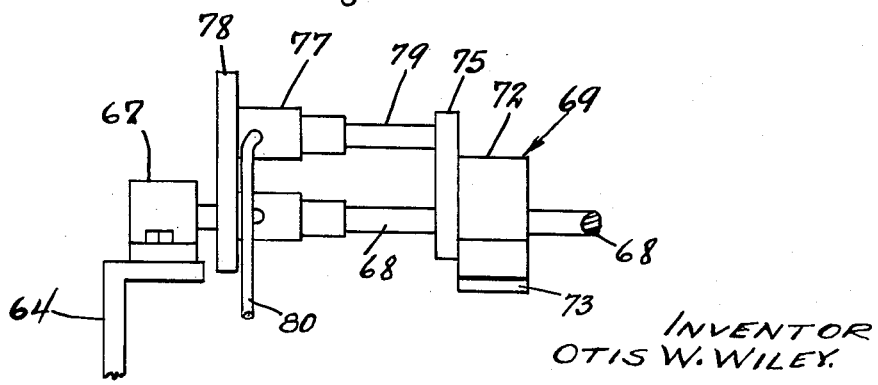

April 29, 1952     O. W. WILEY     2,595,115

APPARATUS FOR CUTTING AND SIZING CELLULAR GLASS SLABS

Filed May 14, 1948     3 Sheets-Sheet 3

INVENTOR
OTIS W. WILEY.

BY Olen E. Bee
ATTORNEY.

Patented Apr. 29, 1952

UNITED STATES PATENT OFFICE 2,595,115

APPARATUS FOR CUTTING AND SIZING CELLULAR GLASS SLABS

Otis W. Wiley, Sedalia, Mo., assignor to Pittsburgh Corning Corporation, Allegheny County, Pa., a corporation of Pennsylvania Application May 14, 1948, Serial No. 27,085

7 Claims. (Cl. 51—105)

The present invention relates to a process of and apparatus for hollowing out and externally forming semi-cylindrical shapes from blanks and it has particular relation to a process of an apparatus for forming semi-cylindrical shapes from rectangular slabs of cellulated glass.

One object of the invention is to provide a process of forming semi-cylindrical shapes suitable for use as pipe coverings from slabs of cellulated glass in which the waste of material is reduced to a minimum.

A second object of the invention is to provide a process of forming semi-cylindrical shapes from prisms of cellular glass which is simple, rapid and which results in semi-cylindrical shapes which are accurately formed.

A third object of the invention is to provide a simple embodiment of apparatus for use in the practice in the method.

These and other objects of the invention will be apparent from consideration of the following specification and the appended claims.

It has heretofore been proposed to form thermally insulative material from glass by finely pulverizing glass, admixing it with carbonaceous material such as powdered coal and heating the mixture in molds of appropriate shape in order to sinter and cohere the particles of glass, then to soften the cohered mass and effect chemical reaction of the carbonaceous material with oxygen supplying constituents of the glass to generate bubbles of entrapped gas in the coherent mass.

This type of process is described in Patent 2,123,536 to Bernard Long. In accordance with the disclosure of the patent the cellulated bodies such as blocks or slabs are formed in molds of appropriate design. This method cannot well be adapted to form shapes and bodies where a certain degree of accuracy or precision of outline is required. For example, it is not well adapted for the molding or forming shapes of semi-annular section such as might be employed for covering steam pipes or other types of pipes. This is true because inherently molds of the desired shape would be difficult to provide and it would be impracticable to strip them from the finished product. Also the product in the course of cooling and annealing tends strongly to distort so that no convenient method of providing shapes of semi-annular section by a simple molding operation is available.

The present invention contemplates a process of forming shapes of cellular glass suitable for covering pipes or the like in which standard slabs of cellular glass are formed by conventional methods and in conventional molds and the slabs are then cut up into prisms of trapezoidal section that are then shaped to semi-annular section with a minimum of waste of the cellulated material constituting the slab. The invention further contemplates a simple mode of and apparatus for coring out the prisms to the desired dimensions by simply placing them against a revolving abrasive mandrel. As a still further feature the invention contemplates disposing the cored prism upon a mandrel corresponding in diameter to the core and parallel to an abrasive drum and then rotating the mandrel to cause the prism to contact with the drum, thus buffing off the corners of the prism and providing a semi-annular section.

For a better understanding of the invention reference may now be had to the accompanying drawings in which:

Fig. 1 illustrates perspectively a slab of cellular glass indicating the manner in which it is cut into prismatic blanks suitable for further coring or hollowing out and rounding to semi-annular shape;

Fig. 2 constitutes a perspective view of a single prismatic blank of trapezoidal section which has been cut out of the slab shown in Fig. 1 and which is suitable for further coring and external rounding;

Fig. 3 is an end elevational view of a prism such as shown in Fig. 2 after it has been cored out;

Fig. 4 is a simplified or diagrammatical end view illustrating the blank and the apparatus employed for coring the blank just prior to initiation of the coring operation;

Fig. 5 is a simplified elevational or diagrammatic view illustrating the conclusion of the coring operation;

Fig. 6 is a simplified elevational or diagrammatic view illustrating a cored blank in position preparatory to being externally rounded to semi-annular section;

Fig. 7 is a simplified elevational or diagrammatic view of a cored blank in position just after initiation of the operation of externally surfacing it;

Fig. 8 is a simplified elevational or diagrammatic view showing a cored blank in position after it has been approximately one-half externally surfaced;

Fig. 9 is a simplified elevational or diagrammatic view illustrating a cored shape of semi-annular section in position at the conclusion of the surfacing operation;

Fig. 10 is an end elevational view of a finished semi-annular shape;

Fig. 11 is a perspective view of the shape shown in Fig. 10;

Fig. 12 is an end elevational view illustrating two of the shapes in position as a covering upon a pipe;

Fig. 15 is a fragmentary front elevational view of a chucking device for holding cored blanks while they are being surfaced.

In the drawings, like numerals refer to like parts throughout.

In the practice of the invention a slab 20 of cellular glass prepared in any convenient manner as for example by the process described in the Patent 2,123,536 may be provided. It is to be understood that this slab is composed of minute particles of glass cohered or sintered together without complete melting and enclosing an enormous number of small hermetically sealed bubbles of gas such as carbon dioxide, sulfur dioxide and the like generated in the cellulating process. Glass of this type, it is to be understood, can be cut by saws or readily abraded by grind stones or sand paper or other agencies of abrasion without fear of rupturing or breaking of the material as a unit. For these reasons, the material is exceedingly well adapted for the process of the present invention. The slab 20 is sawed along the lines 21, 22, 23 and 24, preferably, into prisms of isoceles trapezoidal section. It is desirable, in order to minimize waste, that the internal angles X and Y of the prisms be approximately 120°, that is, each prism constitutes a half of a hexagon, the top and two sides being equal in length. One of the prisms appropriately formed is indicated at 26 in Fig. 2. The slabs may be of any convenient width and length to give the desired number of units per slab. Three units are shown in Fig. 1. The small end wedges 26a, constitute excess material.

Figure 13:
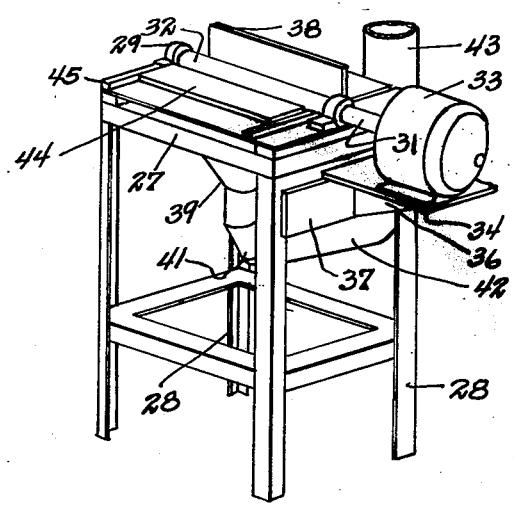
Fig. 13 is a perspective view illustrating an appropriate embodiment of an apparatus for performing the coring or hollowing operation upon a suitable prismatic blank.

Apparatus for coring the prism 26 is illustrated in Fig. 13 of the drawings and includes a platform or table 27, supported upon suitable legs 28. The table is provided with bearing elements at 29 and 30 upon opposite sides thereof within which is journaled a shaft 31 carrying an abrasive roller, e. g. a roller 32 covered with sand paper or other abrasive material. The shaft at one extremity, is driven by a suitable motive means such as an electrical motor 33 disposed upon a platform 34, carried by a bracket 36 upon cross-brace 37. The brace is suitably secured to the legs 28 of the platform.

Contiguous to the roller 32 and in parallelism thereto, is disposed a vertical guide plate 38, so spaced that when a lower corner of a prism or blank 26 is pressed thereagainst, it will be accurately centered with respect to the roller 32 for the coring operation.

In order to carry away the dust abraded from the prisms in the coring operation, suitable ventilating apparatus is provided and includes a funnel shaped head 39 disposed below the roller 32 and being connected by an elbow 41 to a lower horizontal portion 42 of ventilating duct 43. The duct is provided with a suitable fan mechanism (not shown) for generating a suction in the duct in order to carry away the debris from the grinding operation.

A plate 44 adjustable between guides 45, can be adjusted to accommodate different sizes of rollers 32.

The position of a prism or blank 26 preparatory to the coring operation is illustrated diagrammatically in Fig. 4. In the coring operation the prism is simply pressed down manually or by automatic means (not shown) as may be preferred so that the base surface of the prism engages the top of the roller 32. The abrasive member very rapidly bites through the cellular structure as the prism is pushed downwardly. The finish of the coring operation is illustrated diagrammatically in Fig. 5. The slabs at the conclusion of the coring operation are ready for external surfacing upon the apparatus shown in Fig. 14 of the drawings.

This apparatus comprises a platform 46 supported by legs 47 which are also braced by crossbars 48 near the lower extremities thereof. Upon the platform 46, are disposed vertical end elements 49 having bearings 50 upon the upper extremities thereof. Within the bearings, is journaled shaft 51 carrying an abrasive roller 52 of relatively large diameter. This roller may be surfaced with coarse sand paper or other abrasive element.

The shaft conveniently is driven by motor mechanism including electrical motor 53 secured below the platform 46 upon brackets (not shown). A belt or chain 54 is trained about the drive pulley of the motor and in turn is trained about a pulley 55 upon the end of the shaft 51 of the abrasive drum and constitutes means for driving the latter at an appropriate speed.

The drum is also enclosed by a housing 56, which is designed to reduce or prevent the discharge of debris in the form of dust to the atmosphere in the room. This housing is connected by elbow 57 to a duct 58 which is exhausted by appropriate means (not shown).

Guides 59 are disposed upon opposite ends of platform 46 and within the guides are disposed sliding elements 61 of a sliding carriage 62 which has end uprights 63 and 64 which may be provided with vertical fins or ribs 66. Upon the upper extremities of the upright 63 are disposed bearing elements 67 in which is journaled a horizontal shaft 68 which is designed to constitute a mandrel or axle for rotation of the cored sections 26 against the abrasive drum 52.

For purposes of supporting the cored prisms, elements 69 and 71 are keyed upon the shaft. Each of these elements includes a semi-cylindrical upper portion 72 corresponding in diameter to the core of the section or prism 26. These elements also include plates in the plane of the flat surfaces of the semi-cylindrical portions and they provide rests for the lower face of the prisms while they are being faced.

Figure 14:
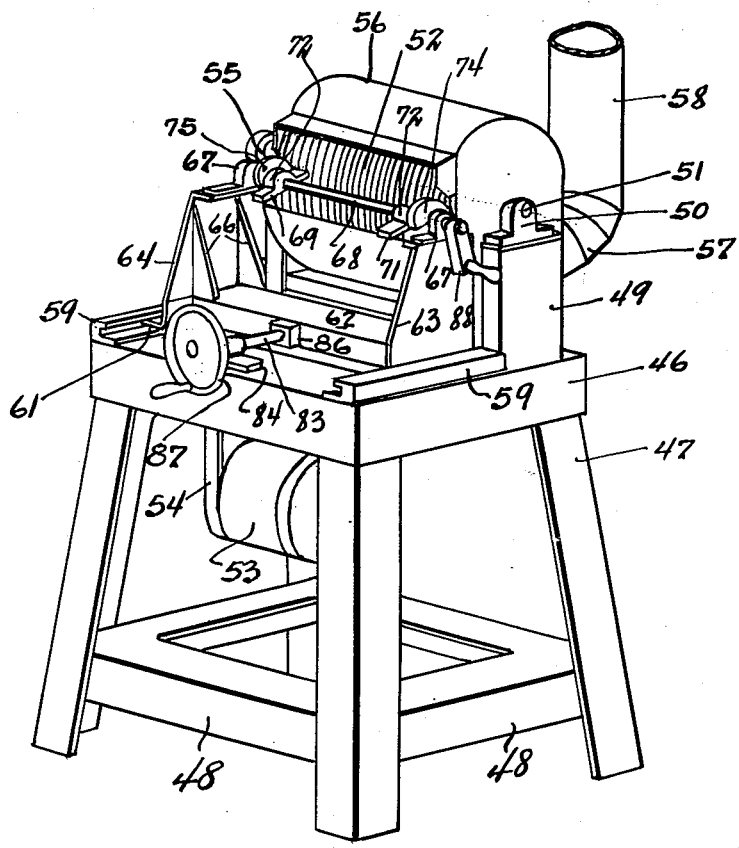
Fig. 14 is a perspective view of an appropriate machine for externally surfacing the prisms after they have been hollowed out upon the apparatus shown in Fig. 13.

As shown in Figs. 14 and 15, apparatus for chucking a cored prism on the mandrel comprises semi-circular end plates 74 and 75 mounted upon the shaft 68. Plate 75 is slidable upon the shaft and may be reciprocated by means that includes an air cylinder 77 upon a bracket 78 that is fixed on shaft 68. A piston 79 reciprocates in the cylinder 77 and is attached at its outer extremity to plate 75 whereby to reciprocate it on shaft 68. An air hose 80 connected to the cylinder supplies actuating fluid thereto. The pressure may be controlled by a valve, (not shown) to actuate the piston and in turn to press plate 75 against the ends of a blank on the mandrel, thus clamping the latter in position.

Apparatus for adjusting the platform or carriage 62 in order to bring the shaft 68 toward or to carry it away from the revolving drum in accordance with the diameter of the blank which is to be surfaced comprises a screw threaded shaft 83, which is threaded into a bearing 84 upon the platform 46. This shaft at its inner extremity is journaled in a suitable swivel connection 86, and at its outer extremity it is provided with a hand wheel 87 by means of which it can be rotated.

Shaft 68 at one extremity is provided with a crank 88 by means of which the shaft may be manually rotated. For example, from position indicated in Fig. 6 to the position indicated in Fig. 7 and subsequently through the position shown in Figs. 8 and 9. In the course of this rotation, the prism 26 is caused to contact with the revolving drum 52 which effectively cuts away the outer surface of the prism to a semi-cylindrical shape. The finish of the surfacing operation is illustrated in Fig. 9 in which the semi-cylindrical shape is indicated as A to distinguish it from the initial prism of trapezoidal section. The shape is indicated in elevation in Fig. 10 and in perspective in Fig. 11.

In Fig. 12 are shown two sections 26-A disposed about a conventional pipe for example, of iron or the like indicated at 90. The sections may conventionally be held in position by wrapping them with strips of metal, with wire tape or other appropriate flexible members. They may also be covered with sheet metal, plaster or other protective surfacing material (not shown).

It will be appreciated by those skilled in the art that the embodiments of the invention herein shown and described are merely by way of example. It will be apparent that numerous modifications may be made therein without departure from the scope of the appended claims.

I claim:

1. A machine for cutting sections of pipe coverings from cellular glass blanks comprising a travelling abrading element, a shaft having a mandrel fixed thereupon of semi-cylindrical section and being of a diameter corresponding to the inner diameter of the pipe covering, said mandrel being provided with seating surfaces for the lower faces of a section of pipe covering to be cut thereupon, said shaft being disposed with respect to the abrading element in such position that the outer surface of the section of pipe covering disposed upon the mandrel will contact with the abrading element as the shaft is rotated.

2. A machine for cutting sections of pipe coverings from cellular glass blanks comprising travelling abrading element, a shaft having a mandrel fixed thereupon of semi-cylindrical section and being of a diameter corresponding to the inner diameter of the pipe covering being cut, said mandrel being provided with seating surfaces for the lower faces of a pipe covering to be formed thereupon, said mandrel being disposed with respect to the abrading element in position that the outer surface of the section of pipe covering disposed thereupon will contact with the abrading element as the shaft is rotated.

3. Apparatus for forming pipe coverings from cellular glass, prisms of trapezoidal section and being cored out to an inner diameter corresponding to the inner diameter of the pipe covering, said apparatus comprising a rotatable mandrel of semi-cylindrical shape, and of a diameter corresponding to the inner diameter of the pipe covering, a drum having an abrasive surface disposed parallel to the shaft and being spaced from the outer surface of the mandrel a distance corresponding to the thickness of the desired pipe covering, means to rotate the mandrel slowly to cause a section of the pipe covering disposed thereupon to contact with the drum to abrade away the projecting corners and a clamping means for holding a prism upon the mandrels comprising end plates secured upon the shaft, one of the end plates being reciprocable coaxially upon the shaft and means to reciprocate the end plate to cause it to contact with the end of a blank disposed upon the mandrel to clamp the shape in position.

4. Apparatus for coring section of pipe covering of the character described from cellular glass blanks, comprising a base, a coring mandrel rotatably mounted on said base and of a length not less than that of the pipe section to be formed, a pair of blank supporting plates adjustably mounted on said base and disposed upon opposite sides of said mandrel with the plane of the upper face of each plate on opposite sides of said mandrel in the horizontal plane of the axis of rotation of said mandrel, one of said plates having an upwardly extending portion disposed in spaced relation to the edge of the plate adjacent the mandrel as a guide for positioning the blank relative to the mandrel.

5. A method for abrasively forming pipe covering sections of the character described from cellular glass blanks comprising the steps of, providing a substantially rectangular blank having a length equal to that of the required completed pipe covering section, coring the blank by pressing a suitable face thereof into engagement with a rotating longitudinally disposed abrasion cylinder, then mounting the blank by means of its cored portion upon a rotatable mandrel disposed in parallel rotation to a longitudinally disposed rotating abrasion cylinder and rotating the mandrel to contact the outer long faces of the blank with the abrasion cylinder to complete the section of pipe covering.

6. A method of abrasively forming sectional pipe covering from cellular glass slabs, comprising the steps of providing a blank having surface dimensions not less than those of the finished product, contacting one face of the blank with a rotating abrasion cylinder having a diameter equal to the inside diameter of the finished product to core the blank, mounting the cored blank on a mandrel in engagement with the core of said blank, and oscillating the mandrel to contact the blank with a rapidly rotating abrading cylinder to form an exterior concentric semi-circular surface on the blank to complete the sectional pipe covering; the mandrel and later abrading cylinder having fixed longitudinal axis of rotation.

7. The method of forming sectional pipe covering from slabs of abradable material comprising the steps of providing a blank having surface dimensions at least equal to those of the finished product, coring a semi-cylindrical opening longitudinally of the blank of a diameter not less than the outside diameter of the pipe to be covered, mounting the blank on a mandrel in engagement with said cored opening and oscillating the mandrel to form by abrasion a semi-cylindrical exterior on the blank concentric with the cored interior.

OTIS W. WILEY.

REFERENCES CITED

The following references are of record in the file of this patent:

UNITED STATES PATENTS

| Number | Name | Date |
| --- | --- | --- |
| 327,934 | Frech | Oct. 6, 1885 |
| 341,581 | Kirchner | May 11, 1886 |
| 1,223,792 | Jeffery et al. | Apr. 24, 1917 |
| 1,483,866 | Bugbee | Feb. 19, 1924 |
| 1,808,442 | Weide | June 2, 1931 |
| 2,147,453 | Miner | Feb. 14, 1939 |
| 2,183,699 | Schweiker | Dec. 19, 1939 |
| 2,212,179 | Martin | Aug. 20, 1940 |
| 2,408,530 | Owen et al. | Oct. 1, 1946 |